United States Patent [19]

Katsura et al.

[11] 3,920,450
[45] Nov. 18, 1975

[54] SOLVENT EXTRACTION OF In AND/OR Ga

[75] Inventors: Tetsuo Katsura, Koganei; Hideki Abe, Kosaka, both of Japan

[73] Assignee: The Dowa Mining Co., Ltd., Tokyo, Japan

[22] Filed: Oct. 18, 1974

[21] Appl. No.: 515,844

[52] U.S. Cl. ............ 75/101 BE; 75/121; 423/112; 23/312 ME
[51] Int. Cl.² ............... C22B 58/00; C01G 15/00
[58] Field of Search ........ 75/101 BE, 121; 423/112; 23/312 ME

[56] References Cited
UNITED STATES PATENTS

| | | | |
|---|---|---|---|
| 3,144,304 | 8/1964 | Nagumo et al. | 75/101 BE |
| 3,151,946 | 10/1964 | Nagumo et al. | 423/112 |
| 3,180,812 | 4/1965 | Beau | 75/101 BE |
| 3,251,646 | 5/1966 | Alon et al. | 75/101 BE |
| 3,507,645 | 4/1970 | Spitzer et al. | 75/101 BE |
| 3,532,490 | 10/1970 | Burkin et al. | 75/101 BE |
| 3,575,687 | 4/1971 | Drobnick et al. | 75/101 BE UX |
| 3,701,650 | 10/1972 | van der Zeeuw | 75/101 BE |
| 3,718,458 | 2/1973 | Ritcey et al. | 75/101 BE |
| 3,844,763 | 10/1974 | Burkin | 75/101 BE |

*Primary Examiner*—G. Ozaki
*Attorney, Agent, or Firm*—Flynn & Frishauf

[57] ABSTRACT

A method of extracting metal values by contacting a solution containing at least one metal of gallium and indium with a cation exchange solvent of a tertiary saturated aliphatic acid dissolved in a water-insoluble diluent, which effects liquid-liquid extraction to extract the metal values from said solution, and then contacting the solvent containing the thus separated metal values with an aqueous phase of a mineral acid to recover the metal values selected from gallium and indium.

12 Claims, 2 Drawing Figures

SOLVENT EXTRACTION OF In AND/OR Ga

BACKGROUND OF THE INVENTION

In one of the prior art industrial processes for the recovery of gallium, a carbon dioxide gas is blown through a filtrate of sodium aluminate solution obtained as by-products in the course of the manufacture of alumina to precipitate crude hydroxide of gallium. Alternatively, the filtrate is electrolysed by using a mercury cathode to produce a gallium amalgam.

In another industrial process for the recovery of gallium, a residue exhausted from an electrolytic process or pyrometallurgical process is utilized. In the electrolytic process a zinc ore is roasted and leached with sulfuric acid leaving a residue. In the pyrometallurgical process a zinc ore is roasted with a reducing agent to evaporate zinc leaving a residue. The thus exhausted residue is subjected to an acid extraction with a strong acid or an acid extraction in a reducing atmosphere or an alkali extraction to prepare a gallium-containing solution, which is then neutralized to precipitate a crude hydroxide of gallium.

Such gallium hydroxide is dissolved in a hydrochloric acid solution and thereafter subjected to a liquid-liquid extraction with isopropyl ether to recover the gallium.

However, the prior art techniques mentioned above have many disadvantages. For example, the process which utilizes blowing of carbon dioxide or neutralization with an alkali agent to prepare hydroxide of gallium is complicated in its operations because filtration of the solution is very difficult. In addition, where a starting solution contains many kinds of elements, such as iron, copper, aluminium, etc., too many hydroxides are in the yield and the yield and selectivity of a desired metal becomes poor, which is serious.

An electrolytic process utilizing the mercury cathode has also some disadvantages because current efficiency is very low, for which a dilute gallium solution, in particular, a solution containing organic matter cannot be effectively processed. The loss of mercury should also be considered. In addition, though a process employing isopropyl ether as an extraction solvent can separate gallium in high selectivity, it requires a highly concentrated hydrochloric acid solution, which has a high solubility for isopropyl ether, so that life of the solvent is relatively short.

Especially a residue which contains iron, aluminium, copper, and zinc in large amounts cannot be hydrometallurgically processed, even if pre-treatment is applied to remove the impurities prior to the solvent extraction.

On the other hand, there are many kinds of industrial processes for recovering indium, including precipitation of a sulfide or hydroxide, substitution with zinc or cadmium or aluminium and solvent extraction. Of these prior art techniques, a solvent extraction from a hydrogen bromide solution with isopropyl ether can extract and separate indium in high selectivity and is thought to be very effective process. However, because it requires hydrogen bromide as an aqueous phase, which is high in cost and has a high solubility for isopropyl ether, the life of the extraction phase of isopropyl ether is relatively short. With respect to the other solvent extraction processes, some of them are effective for some elements and other effective for another, but for indium none of them is effective from a practical view point.

Therefore, an industrial recovery of indium in the prior art has been conducted by the combination of many kinds of separating steps, which are selected in view of incidental elements. However, these processes are still complicated and are not necessarily practical.

Under circumstances wherein the need for indium and gallium increases with the development of industry, a practical method of recovering indium as well as gallium in high yield and in high purity is most desired recently.

BRIEF DESCRIPTION OF THE INVENTION

The primary object of the present invention is to provide a method of recovering at least one element selected from gallium and indium in high selectivity and yield.

Another object of the invention is to provide a method of recovering gallium and indium in high selectivity from a residue which contains a small amount of indium and gallium such as is obtained in the course of processing bauxite, a zinc ore, coal ash, and flue dust containing zinc and lead.

Still another object of the invention is to provide a simple and practical method of recovering gallium and indium without using filtration techniques, independent of the varieties of incidental elements, their amounts, concentrations of indium and gallium and an acid used.

DETAILED DESCRIPTION OF THE INVENTION

The present invention provides a method of recovering metal values in which a solution containing at least one element selected from gallium and indium is contacted with a cation exchange solvent of a tertiary saturated aliphatic acid dissolved in a water-insoluble diluent to extract the elements contained in said solution, and after separating the organic solvent from the extraction system the organic solvent is contacted with an aqueous solution of a mineral acid to extract the elements from said organic solvent.

In other words, the present invention provides a method of recovering at least one element of gallium and indium, which comprises contacting a solution containing at least one element selected from gallium and indium with a cation exchange solvent of a tertiary saturated aliphatic acid, effecting liquid-liquid extraction to separate the gallium and indium, if it contains the two, from the solution, and then contacting the solvent containing the gallium and indium with an aqueous dilute solution of a mineral acid to recover the gallium and indium separated.

The source of gallium and/or indium to be processed by the present invention includes a solution containing at least one member selected from gallium and indium, which is obtained from a process of treating bauxite, a zinc ore, coal ash, and flue dust containing zinc and lead.

The cation exchange solvent used in the present invention is composed of an organic carboxylic acid, particularly a tertiary saturated aliphatic acid dissolved in an organic solvent which is substantially insoluble in water. The tertiary aliphatic acid is typically represented by the formula:

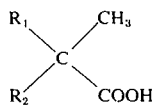

wherein $R_1$ and $R_2$ are each alkyl groups having 3 or 4 carbon atoms. This typical tertiary saturated aliphatic acid is commercially available as "Versatic Acid" sold by Shell Chemical Co. Ltd.

The tertiary saturated aliphatic acid is dissolved in an organic solvent which is insoluble in water, such as xylenes, kerosenes, etc., and serves as a cation exchange solvent.

Figure 1:
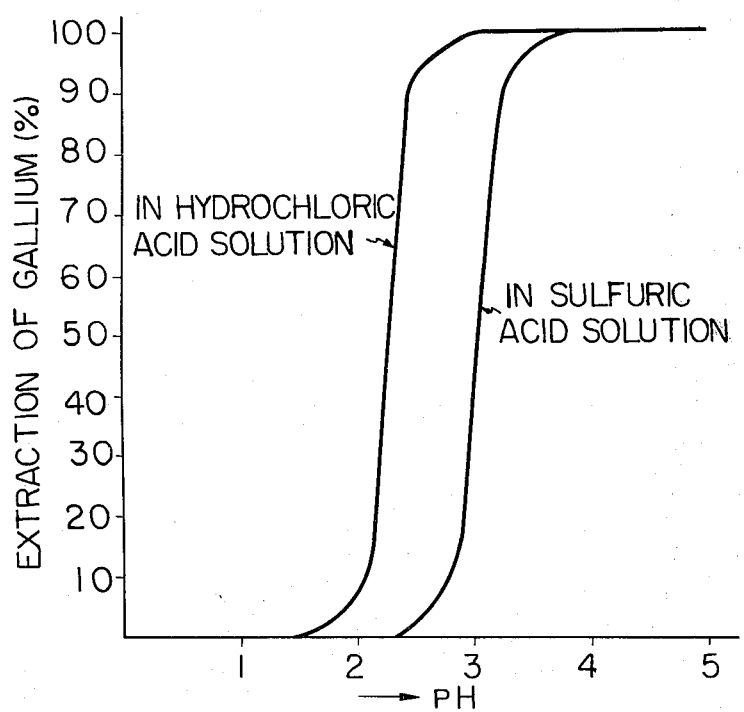
FIG. 1 shows the extraction of gallium with respect to varying pH values of sulfuric acid and hydrochloric acid solutions respectively.
Figure 2:
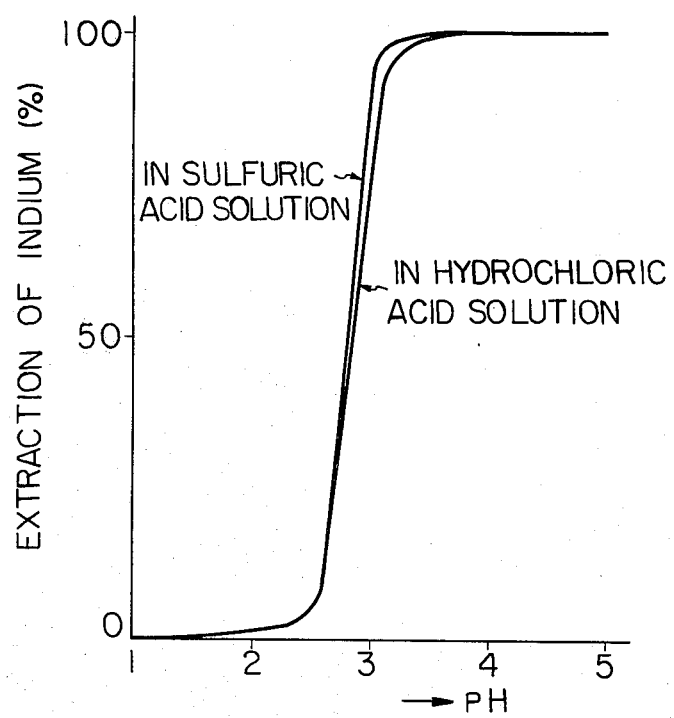
FIG. 2 shows the extraction of indium with respect to varying pH values of sulfuric acid and hydrochloric acid solutions respectively.

The pH value of the extraction system is not necessarily essential, but if the starting solution contains copper, iron (II), aluminium, zinc, nickel, cobalt or arsenic (III), and the process is intended to extract both gallium and indium, then the pH value is restricted to from 2.5 to 4.0, because these incidental elements will also be extracted by the cation exchange solvent having a pH value higher than 4.0. Thus, it is necessary to adjust the pH to within said range in such a case. The solvent extraction of the present invention conducted in said pH range results in the separation of not only indium and gallium, but also molybdenum and iron (III). If the starting solution contains gallium but not indium, the pH of the solution may be adjusted to 1.5 to 5.0, preferably 2.5 to 5.0, so that the gallium contained may successfully be extracted. If the starting solution contains indium but not gallium, the pH of the solution may be adjusted to a value from 1.0 to 5.0, preferably 2.0 to 5.0 so that the separation of indium may successfully be effected. The relation between a pH value and extraction rates of gallium and indium is well explained in FIGS. 1 and 2 attached, which were obtained in accordance with the present invention.

Thus, in a preferred embodiment of the present invention, a starting solution is prepared in a weak acid solution and is commingled with a tertiary saturated aliphatic acid dissolved in an organic solvent, such as xylenes or kerosenes. The organic phase and the aqueous phase are commingled intimately and the mixture is neutralized by adding an alkali agent. Preferably in the pH range from 2.5 to 4.0, the indium and gallium included are substituted with the hydrogen of the carboxylic acid group of the solvent phase, and iron (III), tin, and some molybdenum are also extracted by the solvent.

It has been found that the heavy elements, such as, Cu, Fe, Al, Zn, Ni, Co, As, etc. are not extracted at a pH value of not more than 4.0. Thus, if these elements are included in the system, they are separated from the gallium and indium by adjusting the pH value to between 2.5 and 4.0.

If the present invention intends to process a solution containing gallium but not indium, the solvent extraction may be carried out at a pH between 1.5 to 5.0, preferably 2.5 to 5.0. On the other hand, if said solution contains indium but not gallium, it may be worked at a pH value between 1.0 and 5.0, preferably 2.0 to 5.0.

The gallium and indium extracted by the organic solvent are easily separated from the organic solvent by contacting the solvent with a dilute aqueous solution of a mineral acid, the hydrogen ion of which is replaced with the metallic ions. The tertiary saturated aliphatic acid shows good selectivity with respect to gallium and indium. According to the present invention, it is possible not only to separate both gallium and indium, if the two elements exist in a starting solution, but also to separate gallium or indium alone, if only one of them exists in the starting solution.

The concentrated gallium and indium may be separated by a conventional process by using isopropyl ether and tributyl phosphate. Namely, the back extraction phase is adjusted to a normality of from 2.5 to 6.5 by adding hydrochloric acid to said aqueous dilute solution of a mineral acid and then is contacted with isopropyl ether to separate gallium only and then the remaining solution is further contacted with tributyl phosphate to separate the indium.

The thus separated gallium and indium may respectively be further refined by conventional electrolytic processes.

EXAMPLE 1

A sulfuric acid solution containing gallium and the incidental elements indicated below was prepared to have a pH value of 0.65. To 1.8 lit. of the solution was added 1.0 lit. of a 20% solution of a tertiary saturated aliphatic acid (Versatic Acid, Trade Name, sold by Shell Chemical Co. Ltd.) in kerosene, and then a neutralizing agent was added to adjust the pH value of the extraction system to pH 3.5. The organic phase was separated from the system. The separated organic phase was then subjected to back extraction using a dilute mineral acid solution. The results are summarized in the following Table I.

Table I

| components | $Cu^{++}$ | $Zn^{++}$ | $Fe^{++}$ | $Al^{+++}$ | $Ga^{+++}$ |
|---|---|---|---|---|---|
| starting solution (g/l) | 2.07 | 2.03 | 8.11 | 8.51 | 0.487 |
| extraction (%) | 0.26 | — | 2.5 | 1.01 | 98.4 |

Copper and zinc are not substantially extracted, but some aluminium was extracted. Iron was reacted with oxygen in air to convert itself to Fe (III) a little of which is extracted.

EXAMPLE 2

A sulfuric acid solution containing indium as well as the indicated elements was prepared to have a pH value of 0.75. To 1.8 lit. of the solution was added 1.0 lit. of a 20% solution of the tertiary saturated aliphatic acid in kerosene and a neutralizing agent was added to adjust the pH value of the extraction system to pH 3.5. The organic phase was separated from the system. The separated organic phase was then subjected to back extraction by using a dilute mineral acid solution. The results are summarized in Table II below.

Table II

| components | $Cu^{++}$ | $Zn^{++}$ | $Fe^{++}$ | $Al^{+++}$ | $In^{+++}$ |
|---|---|---|---|---|---|
| starting solution (g/l) | 1.43 | 9.56 | 8.45 | 9.87 | 0.243 |
| extraction (%) | 0.06 | — | 1.3 | 6.1 | 96.5 |

EXAMPLE 3

A sulfuric acid-hydrochloric acid solution containing gallium and indium in addition to many other elements indicated below was prepared to have a pH value of 0.70. To 2.0 lit. of the solution was added 2.0 lit. of a 20% solution of the tertiary saturated aliphatic acid in kerosene, and then a neutralizing agent was added to the extraction system to adjust the pH value of it to pH 3.5, and to extract gallium and indium contained. The separated organic phase was subjected to back extraction by adding to the phase a dilute mineral acid solution. The results are summarized in Table III below.

Table III

| components | $Ga^{+++}$ | $In^{+++}$ | $Cu^{++}$ | $Zn^{++}$ | $Fe^{++}$ | $As^{+++}$ | $Al^{+++}$ |
|---|---|---|---|---|---|---|---|
| starting solution (g/l) | 0.298 | 0.357 | 0.15 | 33.51 | 20.80 | 0.54 | 12.00 |
| extraction (%) | 93.6 | 94.1 | 1.5 | 1.6 | 3.4 | 2.5 | 5.8 |

EXAMPLE 4

A sulfuric acid-hydrochloric acid solution containing gallium and indium in addition to many other elements indicated below was prepared. To 2.0 lit. of the solution was added 1.0 g of sodium hydrogensulfite and then 2.0 lit. of a 20% solution of the tertiary saturated aliphatic acid in kerosene was added to the starting solution. An ammonium gas was blown through the extraction system to adjust its pH value, so that the gallium and indium were extracted into the organic phase. The separated organic phase is further subjected to back extraction by using a dilute mineral acid solution. The results are summarized in Table IV.

Table IV

| components | $Ga^{+++}$ | $In^{+++}$ | $Cu^{++}$ | $Zn^{++}$ | $Fe^{++}$ | $As^{+++}$ | $Al^{+++}$ |
|---|---|---|---|---|---|---|---|
| starting solution (g/l) | 0.314 | 0.222 | 0.05 | 33.52 | 21.53 | 2.76 | 12.50 |
| extraction (%) | 93.4 | 95.0 | — | 1.7 | 3.7 | 1.3 | 6.1 |

The addition of sodium hydrogensulfite improves the separation of the solvent phase and the aqueous phase even if much arsenic is present in the starting solution, resulting in easy extraction of gallium and indium.

EXAMPLE 5

An aqueous solution containing gallium and indium as well as incidental elements indicated below was contacted with a solution of the tertiary saturated aliphatic acid to solvent-extract the gallium and indium from the aqueous phase. The separated solvent phase was then commingled with hydrochoric acid to remove the indium and gallium to the hydrochloric acid solution. The pH value of the thus obtained hydrochloric acid solution was adjusted to within the range of 5.0 and 6.5N. Then isopropyl ether was added to the solution to extract the gallium only, and then tributyl phosphate was added to the gallium-lean solvent to extract the indium. The results are shown in Table V.

Table V

| components | $Ga^{+++}$ | $In^{+++}$ | $Fe^{++}$ | $Al^{+++}$ | $Zn^{++}$ | $As^{+++}$ |
|---|---|---|---|---|---|---|
| after back extraction | 15.3 | 11.6 | 30.4 | 8.9 | 13.6 | 1.0 |
| after extraction with iso-propyl ether | 0.1 | 11.3 | 30.0 | 8.9 | 13.4 | 1.0 |
| after extraction with tri-butyl phosphate | — | 0.2 | 29.5 | 8.9 | 13.3 | 0.9 |
| extraction | 99.3 | 2.6 | 1.3 | — | 1.5 | — |
| extraction | — | 98.2 | 1.7 | — | 0.7 | 10.0 |

As are apparent from the data above, the total extraction of indium and gallium are 95.5% and 99.3% respectively.

EXAMPLE 6

The isopropyl ether solvent phase containing concentrated gallium therein, which was obtained from Example 5 was commingled with an equal amount of water to extract the gallium into the aqueous phase. To the separated aqueous phase was added caustic soda to adjust the pH value at a pH above 12. After filtration sulfuric acid was added to the filtrate to precipitate gallium hydroxide at a pH value of from 4 to 7. The thus obtained gallium hydroxide was dissolved in a solution of caustic soda to give a gallium concentration of 100 to 200 g/lit., which was then electrolyzed at 3 voltages. The analysis results of the final metallic gallium are shown in Table VI.

Table VI

| impurities | Cu | Zn | Fe | Pb | In | Al | Sn | Bi |
|---|---|---|---|---|---|---|---|---|

Table VI-continued

| (ppm) | 0.5 | 0.50 | 1.27 | 0.8 | 1.3 | 0.5 | 1.8 | 0.5 |
|---|---|---|---|---|---|---|---|---|

EXAMPLE 7

The tributyl phosphate solvent phase containing concentrated indium therein, which was obtained from Example 5 was commingled with an equal amount of water to extract the indium into the aqueous phase. To the separated aqueous phase was blown an ammonium gas to precipitate hydroxide indium. The resulting hydroxide of indium was recovered by filtration and was dried to provide indium oxide. The indium oxide was combined with an equivalent of oil coke, and was subjected to reductive roasting at 1000°C for 2 hours to provide metallic indium. The resulting indium metal was formed into an anode with which electrolysis was conducted.

The analysis results of the final metal indium are shown in Table VII below.

Table VII

| impurities | Cu | Pb | Zn | Fe | Sn | Ga | Ge | Al |
|---|---|---|---|---|---|---|---|---|
| (ppm) | 2.0 | 5.0 | 0.8 | 2.4 | 2.1 | 0.1 | 0.2 | 0.2 |

What I claim:

1. A method of recovering metal values from a solution containing at least one element selected from gallium and indium, which comprises contacting said solution with a cation exchange solvent of a tertiary saturated aliphatic acid dissolved in a water-insoluble diluent to extract the element into the organic solvent, separating the organic solvent from the resulting extraction mixture, and contacting the separated organic solvent with an aqueous solution of a mineral acid to extract the element therefrom.

2. The method of claim 1, in which said solution contains gallium and indium, and the extraction of gallium and indium with the cation exchange solvent is carried out at a pH value in the range of from 2.5 to 4.0.

3. The method of claim 1, in which said solution contains gallium but not indium, and the extraction of gallium with the cation exchange solvent is carried out at a pH value in the range of from 1.5 to 5.0.

4. The method of claim 1, in which said solution contains indium but not gallium, and the extraction of indium with the cation exchange solvent is carried out at a pH value in the range of from 1.0 to 5.0.

5. The method of claim 1, in which the tertiary saturated aliphatic acid is selected from compounds represented by the formula:

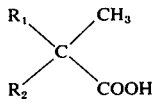

wherein $R_1$ and $R_2$ are each selected from alkyl groups having 3 and 4 carbon atoms.

6. The method of claim 1, in which the water-insoluble diluent is selected from the group of a xylene and a kerosene.

7. The method of claim 1, in which prior to the solvent extraction with the cation exchange solvent, sodium hydrogensulfite is added to said solution containing said element or elements and arsenic to inhibit the precipitation of arsenite.

8. A method of recovering gallium and indium, in which a solution containing gallium and indium is contacted with a cation exchange solvent of a tertiary saturated aliphatic acid dissolved in a waterinsoluble diluent to extract the gallium and indium into the organic solvent, separating the organic solvent from the resulting extraction mixture, contacting the separated organic solvent containing the gallium and indium with an aqueous dilute solution of a mineral acid to extract the gallium and indium into the mineral acid solution, contacting the resulting mineral acid solution containing gallium and indium with isopropyl ether to extract gallium from the resulting mineral acid solution, and contacting the remaining mineral acid solution containing indium with tributyl phosphate to extract the indium from said remaining mineral acid solution.

9. The method of claim 8, in which the extraction of gallium and indium with the cation exchange solvent is carried out at a pH value in the range of from 2.5 to 4.0.

10. The method of Claim 8, in which the tertiary saturated aliphatic acid is selected from compounds represented by the formula:

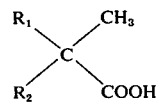

wherein $R_1$ and $R_2$ are each selected from alkyl groups having 3 and 4 carbon atoms.

11. The method of claim 8, in which the water-insoluble diluent is selected from the group of a xylene and a kerosene.

12. The method of claim 8, in which prior to the solvent extraction with the cation exchange solvent, sodium hydrogensulfite is added to said solution containing gallium, indium and arsenic to inhibit the precipitation of arsenite.

* * * * *